United States Patent
Candelore

(10) Patent No.: US 10,686,991 B2
(45) Date of Patent: Jun. 16, 2020

(54) TECHNIQUES FOR IMPROVING PHOTOGRAPH QUALITY FOR FOULED LENS OR SENSOR SITUATIONS

(71) Applicant: Sony Corporation, Tokyo (JP)

(72) Inventor: Brant Candelore, Escondido, CA (US)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/127,880

(22) Filed: Sep. 11, 2018

(65) Prior Publication Data

US 2020/0084389 A1 Mar. 12, 2020

(51) Int. Cl.
*H04N 5/232* (2006.01)
*H04N 5/225* (2006.01)
*H04N 5/217* (2011.01)

(52) U.S. Cl.
CPC ..... *H04N 5/232933* (2018.08); *H04N 5/2171* (2013.01); *H04N 5/22521* (2018.08); *H04N 5/23229* (2013.01)

(58) Field of Classification Search
CPC ......... H04N 5/232933; H04N 5/22521; H04N 5/2171; H04N 5/23229
See application file for complete search history.

(56) References Cited

U.S. PATENT DOCUMENTS

| | | | |
|---|---|---|---|
| 6,301,440 B1 | 10/2001 | Bolle et al. | |
| 7,616,248 B2 | 11/2009 | Parulski et al. | |
| 8,243,166 B2 | 8/2012 | Kumar et al. | |
| 8,498,486 B2 | 7/2013 | Forutanpour | |
| 2002/0154829 A1 | 10/2002 | Tsukioka | |
| 2004/0207743 A1 | 10/2004 | Nozaki et al. | |
| 2006/0034602 A1 | 2/2006 | Fukui | |
| 2009/0102963 A1 | 4/2009 | Yeo et al. | |
| 2009/0175613 A1 | 7/2009 | Thorn | |
| 2011/0069194 A1 | 3/2011 | Okada | |
| 2011/0134312 A1 | 6/2011 | Tay | |
| 2013/0271796 A1 | 10/2013 | Landa | |
| 2014/0192217 A1 | 7/2014 | Kim et al. | |
| 2015/0054965 A1 | 2/2015 | Sudo et al. | |
| 2015/0156419 A1 | 6/2015 | Aggarwal et al. | |
| 2015/0187056 A1 | 7/2015 | Nakamae et al. | |
| 2017/0104986 A1 | 4/2017 | Zhang | |

(Continued)

FOREIGN PATENT DOCUMENTS

| JP | 2006019874 A | 1/2006 |
|---|---|---|
| JP | 3807331 B2 | 8/2006 |

(Continued)

OTHER PUBLICATIONS

Brant Candelore, "Techniques for Improving Photograph Quality for Common Problem Situations", related U.S. Appl. No. 16/058,468, Non-Final Office Action dated Oct. 4, 2019.

(Continued)

*Primary Examiner* — Twyler L Haskins
*Assistant Examiner* — Angel L Garces-Rivera
(74) *Attorney, Agent, or Firm* — John L. Rogitz

(57) ABSTRACT

A photograph is processed using signal processing or image comparison to determine whether a smudge or speck of dust on the lens or sensor appears in the photograph. If it does, an alert is generated on the imaging device so that the user is made aware and can take immediate corrective action, e.g. clean the lens or sensor, and/or allow the camera to remove the effects of the smudge or dust automatically.

15 Claims, 5 Drawing Sheets

(56) References Cited

U.S. PATENT DOCUMENTS

| | | |
|---|---|---|
| 2017/0221244 A1 | 8/2017 | Hiraga et al. |
| 2018/0091732 A1 | 3/2018 | Wilson et al. |
| 2018/0125610 A1 | 5/2018 | Carrier, Jr. et al. |
| 2018/0247505 A1 | 8/2018 | Arai et al. |
| 2018/0314812 A1 | 11/2018 | Qin et al. |
| 2019/0208116 A1 | 7/2019 | Paul |

FOREIGN PATENT DOCUMENTS

| | | |
|---|---|---|
| JP | 2007049631 A | 2/2007 |
| JP | 5414399 B2 | 2/2014 |

OTHER PUBLICATIONS

Brant Candelore, "Techniques for Improving Photograph Quality for Common Problem Situations", related U.S. Appl. No. 16/058,468, Applicant's response to Non-Final Office Action filed Oct. 11, 2019.

Grant Candelore, "Techniques for Improving Photograph Quality for Poor Focus Situations", related U.S. Appl. No. 16/127,680, Non-Final Office Action dated Sep. 27, 2019.

Grant Candelore, "Techniques for Improving Photograph Quality for Poor Focus Situations", related U.S. Appl. No. 16/127,680, Applicant's response to Non-Final Office Action filed Oct. 3, 2019.

"FUJIFILM FinePix S4200—Feature 2 SR Auto & Detect Functions", FUJIFILM, Jan. 5, 2012, retrieved from http://www.fujifilm.in/en/products/consumer_products/digital_cameras/finepix/s/finepix_s4200/features/page_02/.

Einecke, Nils, Gandhi, Harsh, Deigmoller, Jorg, "Detection of Camera Artifacts from Camera Images", 17th International Conference on Intelligent Transportation Systems (ITSC), Oct. 8-11, 2014, Qingdao, China.

Brant Candelore, "Techniques for Improving Photograph Quality for Common Problem Situations", file history of related U.S. Appl. No. 16/058,468, filed Aug. 8, 2018.

Brant Candelore, "Techniques for Improving Photograph Quality for Poor Focus Situations", file history of related U.S. Appl. No. 16/127,680, filed Sep. 11, 2018.

Brant Candelore, "Techniques for Improving Photograph Quality for Common Problem Situations", related U.S. Appl. No. 16/058,468, Applicant's response to Final Office Action filed Nov. 18, 2019.

Brant Candelore, "Techniques for Improving Photograph Quality for Common Problem Situations", related U.S. Appl. No. 16/058,468, Non-Final Office Action dated Jan. 27, 2020.

Brant Candelore, "Techniques for Improving Photograph Quality for Common Problem Situations", related U.S. Appl. No. 16/058,468, Applicant's response to Non-Final Office Action filed Feb. 4, 2020.

Brant Candelore, "Techniques for Improving Photograph Quality for Poor Focus Situations", related U.S. Appl. No. 16/127,680, Final Office Action dated Feb. 26, 2020.

Brant Candelore, "Techniques for Improving Photograph Quality for Poor Focus Situations", related U.S. Appl. No. 16/127,680, Applicant's response to Final Office Action filed Mar. 4, 2020.

Brant Candelore, "Techniques for Improving Photograph Quality for Common Problem Situations", related U.S. Appl. No. 16/058,468, Final Office Action dated Nov. 14, 2019.

Brant Candelore, "Techniques for Improving Photograph Quality for Common Problem Situations", related U.S. Appl. No. 16/058,468, Applicant's response to Final Office Action filed Nov. 25, 2019.

600

602 — IF I TAKE A PICTURE AND LENS IS DIRTY:
- NO ACTION — 604
- ALERT ME — 606
- ALERT ME AND AUTO TAKE ANOTHER — 608
- AUTO TAKE ANOTHER PIC, NO ALERT — 610
- TELL ME IF IT'S GOOD — 612

⇒ TAKE PHOTO OF CLEAN WHITE PAPER — 702
⇒ TAKE PHOTO WITH LENS COVER ON — 704

FIG. 7

TECHNIQUES FOR IMPROVING PHOTOGRAPH QUALITY FOR FOULED LENS OR SENSOR SITUATIONS

FIELD

The present application relates to technically inventive, non-routine solutions that are necessarily rooted in computer technology and that produce concrete technical improvements.

BACKGROUND

Many cameras, such as the Sony Alpha or RX1000 series, come in small packages with small screens. Such cameras may still be able to render high resolution images, but as understood herein, it can be difficult to see images on the screen in bright light (in the sun) and because the camera images on the screen are too small. Often, the front lens is recessed from the body of the camera and small, making it difficult to inspect for smudges or attached debris. If a flaw in the image is subsequently discovered when, e.g., the camera is relocated into low light or the image downloaded to a large screen device, it is usually impractical or unfeasible to recreate the scene, such as for group photos or summit photo during a hike up a mountain.

SUMMARY

Present principles recognize the above problems and so provide an assembly with a housing. At least one processor is in the housing, and at least one imager is supported on the housing and is configured to communicate with the processor. At least one computer storage also is in the housing and includes instructions executable by the processor to render a first photograph. The instructions are executable to, responsive to the first photograph including an anomaly caused by debris on a lens or sensor, generate a first signal to cause an alert to be presented on the assembly so that the user can take corrective action if desired, and/or to allow the anomalies in the photograph to be automatically digitally removed without user intervention. The location of the anomaly can optionally be shown in the display—whether it be on the lens or sensor—to help the user with its removal. Based on the alert, the user can take immediate corrective action such as wiping off the lens or disassembling the camera to brush debris off the sensor. If the anomalies are not too great, the user can decide to ignore them or to have the camera automatically digitally fix them.

In some examples, the first photograph is rendered responsive to actuation of a shutter associated with the imager. The alert may include an audible alert and/or a visible alert. The alert can be a first alert and the instructions can be executable to, responsive to the first photograph not including an anomaly caused by debris on a lens or sensor, generate a second signal to cause a second alert to be presented on the assembly, with the second alert being different from the first alert. The second alert can include a combined signal "all good" of all of the checks performed on the first photograph.

As disclosed further below, the instructions can be executable to determine whether the first photograph includes an anomaly caused by debris on a lens or sensor using image recognition including comparing the first photograph to one or more images captured prior to generating the first photograph. If certain darken features in the photograph are always present, then there is debris or a smudge in the optical path. This is easier to detect when it is directly on the sensor. When it is on the lens, the focusing of the lens will spread a shadow over the sensor. Nonetheless, the attenuation of the diffused light in certain patches on the sensor as the camera is moved around makes the debris or smudge detectable. Alternatively, an image may be examined using signal processing as described in U.S. Pat. Nos. 8,244,057 and 7,310,450, incorporated herein by reference. Determining whether the first photograph includes an anomaly caused by debris on a lens or sensor can be executed by a server receiving the first photograph. Or, determining whether the first photograph includes an anomaly caused by debris on a lens or sensor can be executed by the processor of the assembly.

In another aspect, a computer storage device that is not a transitory signal includes instructions executable by at least one processor to present on at least one computer display at least one user interface (UI). The UI includes at least a first selector selectable to cause an imaging device to present a first alert responsive to a first photograph taken by the imaging device being determined to include an image of a smudge or other object on a lens or sensor of the imaging device. The UI also includes at least a second selector selectable to cause the imaging device to automatically fix the first photograph responsive to the first photograph being determined to include an image of a smudge or other object on a lens or sensor of the imaging device, by creating a second photograph or replacing (overwriting) the first photograph in the memory of the assembly In another aspect, a method includes receiving a first photograph from an imaging device imager and determining whether the first photograph is fouled by a dirty lens or sensor. Responsive to the first photograph being fouled by a dirty lens or sensor, the method includes generating a first signal to cause an alert to be presented on the assembly, and/or fixing the first photograph by replacing (overwriting) the first photograph or created a second photograph to be rendered automatically without user intervention.

The details of the present disclosure, both as to its structure and operation, can be best understood in reference to the accompanying drawings, in which like reference numerals refer to like parts, and in which:

BRIEF DESCRIPTION OF THE DRAWINGS

FIG. 6 is a screen shot of an example user interface (UI) consistent with present principles; and FIG. 7 is a screen shot of another example user interface (UI) consistent present principles.

DETAILED DESCRIPTION

Figure 1:
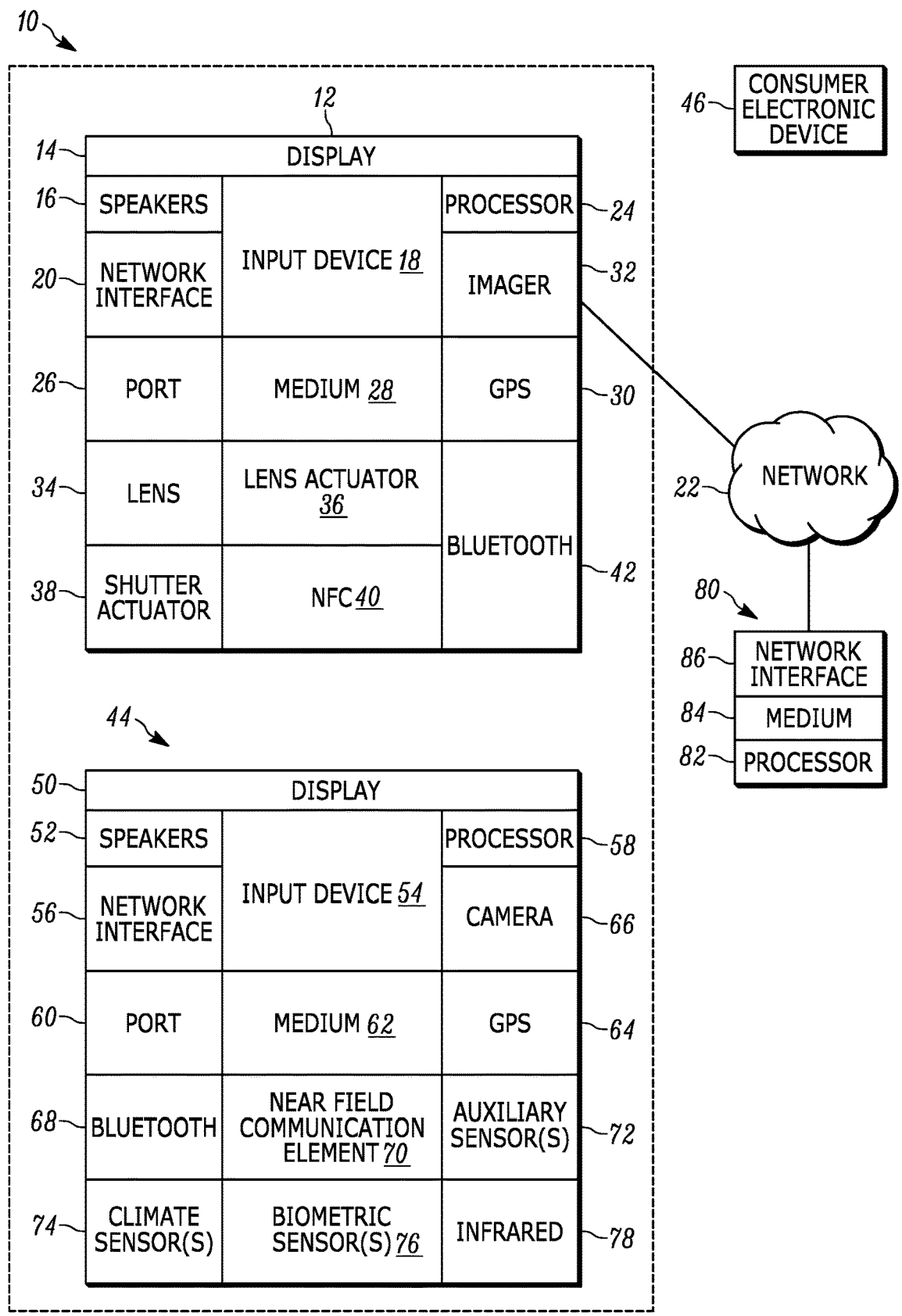
FIG. 1 is a block diagram of an example system including an example in consistent with present principles.

This disclosure relates generally to computer ecosystems including aspects of consumer electronics (CE) device-based user information in computer ecosystems. A system herein may include server and client components, connected over a network such that data may be exchanged between the client and server components. The client components may include one or more computing devices including imaging devices such as standalone digital cameras and cameras in mobile telephones, alone or in conjunction with portable televisions smart TVs, Internet-enabled TVs), portable computers such as laptops and tablet computers, and other mobile devices. These client devices may operate with a variety of operating environments. For example, some of the client computers may employ, as examples, operating systems from Microsoft, or a Unix operating system, or operating systems produced by Apple, Inc. or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone. C alone. A and B together. A and C together. B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example imaging device (ID) 12 that may be a standalone imaging device, or an imaging device incorporated in another apparatus such as a mobile telephone, mobile computer, etc. Regardless, it is to be understood that the ID 12 is configured to undertake present principles (e.g. communicate with other CE devices to undertake present principles, execute the logic described herein, and perform any other functions and/or operations described herein).

Accordingly, to undertake such principles the ID 12 can be established by some or all of the components shown in FIG. 1. For example, the ID 12 can include one or more displays 14 that may be touch-enabled for receiving consumer input signals via touches on the display. The ID 12 may include one or more speakers 16 for outputting audio in accordance with present principles, and at least one additional input device 18 such as an audio receiver/microphone for e.g. entering audible commands to the ID 12 to control the ID 12, control keys for entering commands and/or data, etc. The example ID 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. The one or more interfaces 20 may include a wireless telephony transceiver such as but not limited to global systems for communication (GSM) transceiver, a code division multiple access (CDMA) transceiver including w-CDMA, an orthogonal frequency division multiplex (OFDM) transceiver, etc.

It is to be understood that the processor 24 controls the ID 12 to undertake present principles, including the other elements of the ID 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the ID 12 may also include one or more input ports 26 such as, e.g., a USB port to physically connect (e.g. using a wired connection to another CE device and/or a headphone port to connect headphones to the ID 12 for presentation of audio from the ID 12 to a consumer through the headphones. The ID 12 may further include one or more computer memories 28 that are not transitory signals, such as disk-based or solid-state storage (including but not limited to flash memory). Also, in some embodiments, the ID 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the ID 12 is disposed in conjunction with the processor 24. However, it is to be understood that that another suitable position receiver other than a cell phone receiver, GPS receiver and/or altimeter may be used in accordance with present principles to e.g. determine the location of the ID 12 in e.g. all three dimensions.

Continuing the description of the ID 12, in some embodiments the ID 12 may include one or more imagers 32 that may be, e.g., a thermal imaging camera, a digital camera such as a webcam, and/or a camera integrated into the ID 12 and controllable by the processor 24 to gather pictures/images and/or video in accordance with present principles. An imager may be implemented by, without limitation, a charge-coupled device (CCD) or complementary metal-oxide-semiconductor (CMOS) device.

Light from objects may enter the imager 32 through one or more lenses 34. The lens 34 may be movable by a lens actuator 36 to focus the image on the imager 32. Without limitation, the imager 32 with lens 34 may be implemented in a digital single lens reflex (DSLR) package.

One or more shutter actuators 38 may be provided on the ID 12. The shutter actuator 38 can be manipulated to cause a shutter to open or otherwise "take" a picture. The shutter actuator may be implemented by s hardware key or soft key.

Also included on the ID 12 may be a Bluetooth transceiver 42 and other Near Field Communication (NFC) element 40 for communication with other devices using Bluetooth and/or NFC technology, respectively. An example NFC element can be a radio frequency identification (RFID) element. A battery (not shown) may be provided for powering the ID 12.

Still referring to FIG. 1, in addition to the ID 12, the system 10 may include one or ore other CE device types. In one example, a first CE device 44 may be used to exchange photographic and video information with the II) 12 and/or with the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network.

The example non-limiting first CE device 44 may be established by any one of the above-mentioned devices, for example, an internet-enabled TV, a portable wireless laptop computer or tablet computer or notebook computer, and accordingly may have one or more of the components described below. The first CE device 44 alternatively may be embodied in the form of eyeglasses or a wireless telephone. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device such as the ID 12 and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, fight sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router. Wi-Fi transceiver, or other appropriate interface such as, a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
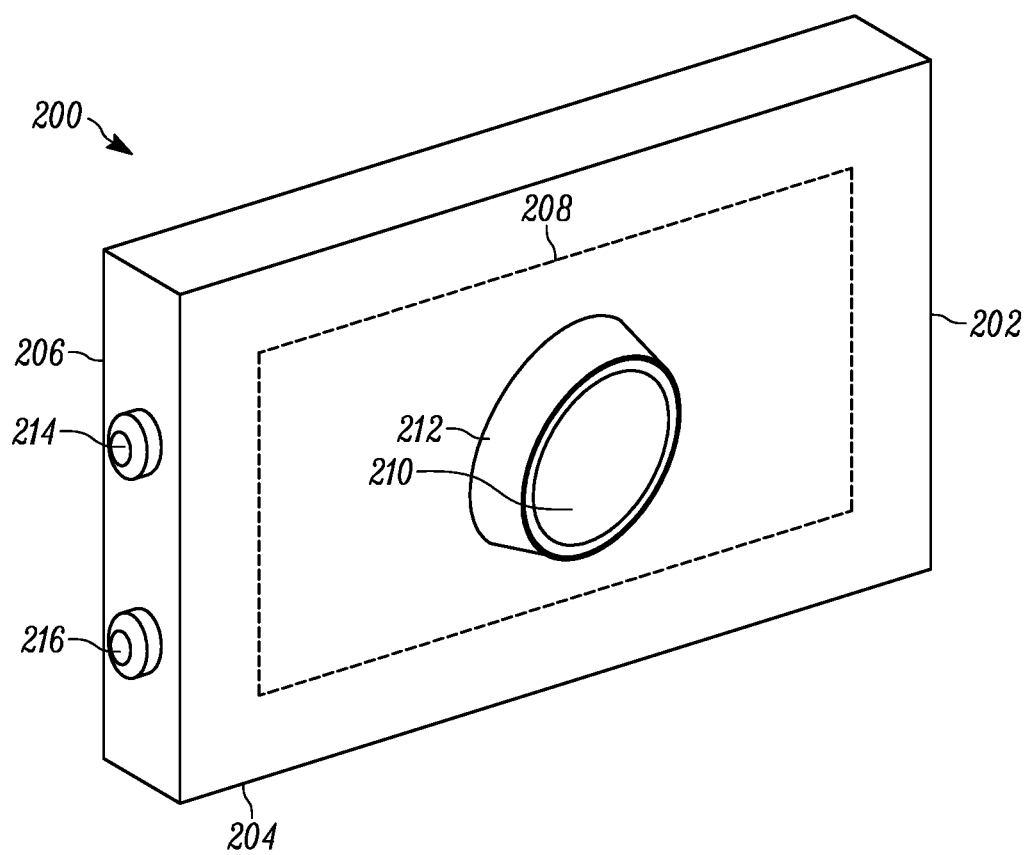
FIG. 2 is a view of a camera implemented as a standalone device.

FIG. 2 illustrates a first example implementation of the ID 12, showing a standalone camera device 200 with a housing 202 containing components described above and having a front 204 and a back 206 (relative to the user, with the back 206 facing the user when in use to take pictures). A display 208 (shown in phantom in FIG. 2) may be part of the back 206 of the camera device 200. The display 208 can present images as generated by the imager within the housing 202.

As shown in FIG. 2, the camera device 200 may include a lens 210 that may be moved be a lens actuator 212 to focus the image on the imager behind the lens not shown). In the example of FIG. 2, a shutter actuator button 214 is on the housing 202 and can be manipulated to capture an image to "take a picture" as a digital photograph. If desired, one or more lamps 216 such as light emitting diodes (LEDs) or other lamps may be provided.

Figure 3:
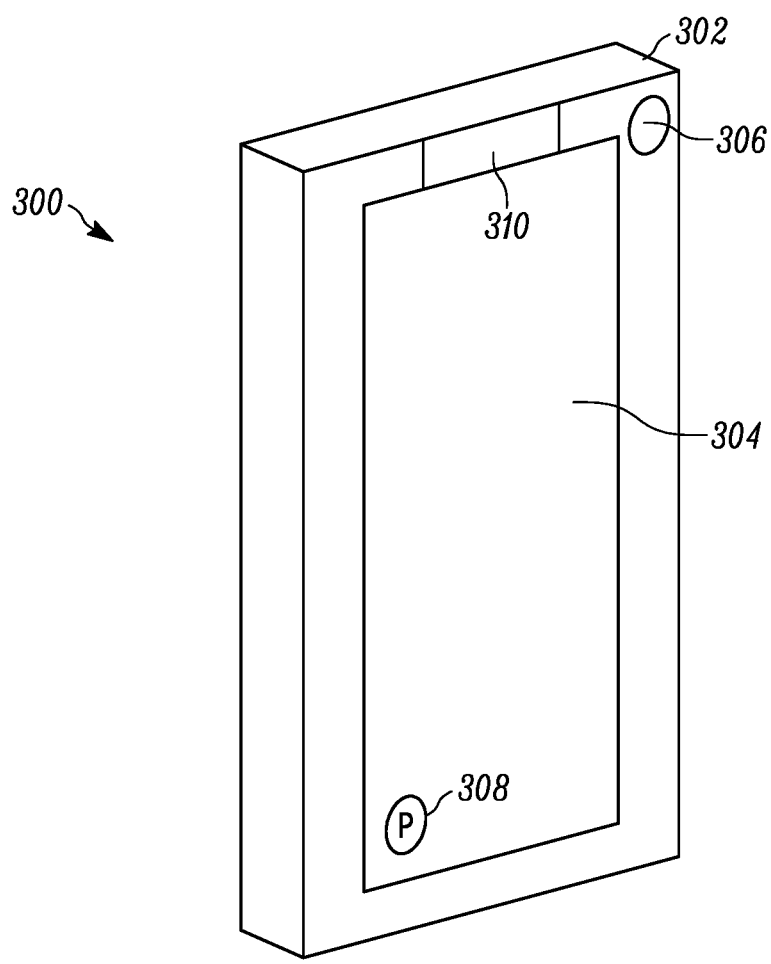
FIG. 3 is a view of a camera implemented as a mobile telephone.

FIG. 3 illustrates a second example implementation of the ID 12, implemented as a mobile telephone 300 with a housing 302 containing components described above. A display 304 is on the housing 302 to present images as generated by the imager within the housing 302. A lens 306 is provided to focus the image on the imager behind the lens (not shown). The display 304 may be touch-enabled and may present a soft shutter actuator 308 that can be manipulated to capture an image to "take a picture" as a digital photograph. If desired, one or more lamps 310 such as light emitting diodes (LEDs) or other lamps may be provided, in the example shown, behind a bezel or display but visible therethrough. The LEDs described herein may be multi-colored to illuminate in one of multiple available colors such as green, red, and blue under command of the processor of the device.

Figure 4:
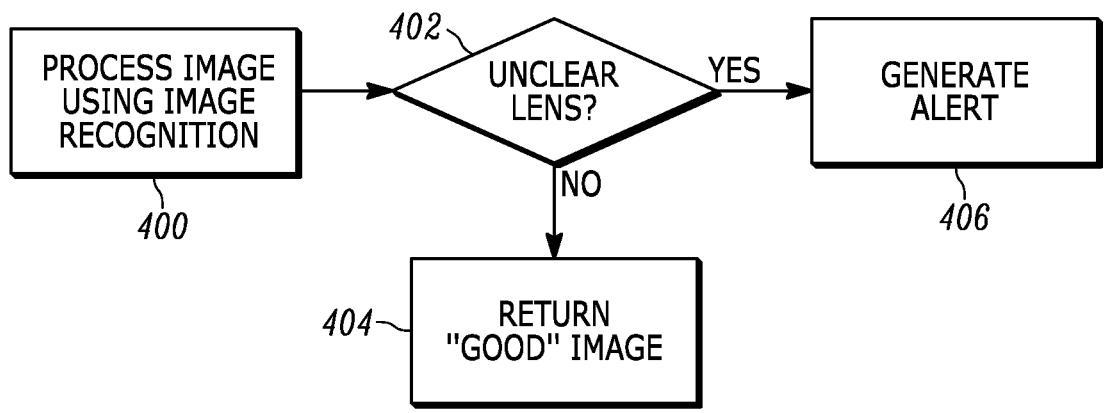
FIG. 4 is a flow chart of example logic of a first embodiment consistent with present principles.
Figure 5:
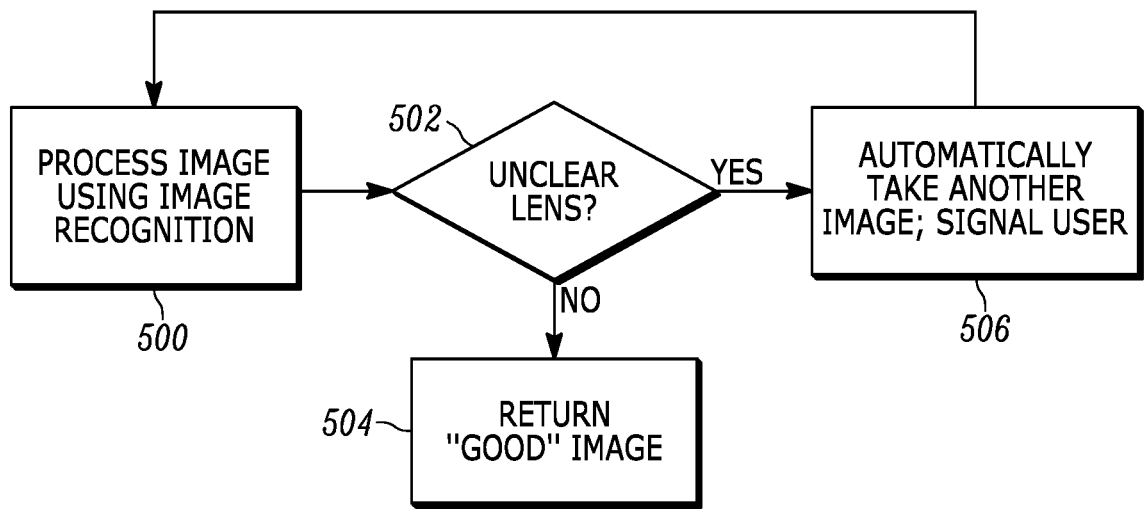
FIG. 5 is a flow chart of example logic of a second embodiment consistent with present principles.

FIGS. 4 and 5 show logic that may be executed by any of the imaging devices described herein locally and/or in connection with offloading information to the server 80 for analysis and return of output information relating to whether a photograph is "good" or not in terms of whether the lens is smudged or has a speck of dust on it. FIG. 4 commences at block 400 after an image is captured typically by manipulating a shutter actuator. Present principles understand that while pre-processing of certain image features such as "not smiling" or other analysis of "unacceptable" image features may be performed, between the time the pre-processing may output a signal indicating that subjects in the image field are ready to be photographed ("acceptable") and the time the photographer actuates the shutter, the situation may have changed from "acceptable" to "unacceptable". In fact, the pre-flash to prevent "red eye" in some cameras often causes people posing to shut their eyes. And so consequently, the image captured has people with their eyes closed.

Accordingly, once an image is captured to render a photograph by, e.g., actuating the shutter actuator, the process in FIG. 4 begins at block 400 to process the image using image recognition. The photograph that has been captured can be compared to one or more prior images as described further below. For example, the photograph can be compared to one or more previous photographs that object recognition indicates show different objects, but the same artifact or anomaly as in the photograph under test, indicating that the lens or possibly the imager itself is fouled with a smudge or dirt or other unwanted object. Other examples of comparison photographs are described in reference to FIG. 7 below.

Note that FIG. 4 may be executed wholly by the imaging device itself, or the imaging device may upload the photograph to the server 80 with the server 80 executing blocks 402-406.

Moving to decision diamond 402 it is determined from image recognition whether the photograph contains an anomaly or artifact caused by a fouled lens. If the image is acceptable (in this case, no anomaly or artifact), the logic moves to block 404 to return "good image". On the other hand, if there is a flaw in the image such as being fouled by an artifact or anomaly from dirt or smudges on the lens, the logic moves to block 406 to generate an alert to indicate that the photograph has a flaw in it.

In example embodiments, responsive to a "good image" being returned at block 404, the imaging device may take no further action. Or, the imaging device may illuminate a lamp such as a green LED indicating the photograph is "good" (not fouled by an artifact or anomaly). In addition, or alternatively, the imaging device may actuate its speaker(s) to play one or more sounds, such as a pleasant chime, indicating that the photograph is "good".

On the other hand, responsive to the output of a "bad" or unacceptably fouled photograph signal at block 406, the imaging device may illuminate a lamp such as a red LED indicating the photograph is "no good" or unacceptably fouled. In addition, or alternatively, the imaging device may actuate its speaker(s) to play one or more sounds, such as an unpleasant buzz, indicating that the photograph is "no good" or unacceptably fouled.

FIG. 5 commences at block 500 after an image is captured typically by manipulating a shutter actuator. Once an image is captured by, e.g., actuating the shutter actuator, the process in FIG. 5 begins at block 500 to process the image using image recognition. In the instant case, the photograph is determined to contain an anomaly or artifact from lens fouling (or imager fouling) or not. Note that FIG. 5 may be executed wholly by the imaging device itself, or the imaging device may upload the photograph to the server 80 with the server 80 executing blocks 502-506.

Moving to decision diamond 502 it is determined from image recognition whether the image is not unacceptably fouled described above. If the image is acceptable, the logic moves to block 504 to return "good image". On the other hand, if the photograph contains an artifact or anomaly caused by a fouled lens (or imager), the logic moves to block 506 to generate an alert to indicate that the photograph has a flaw in it, and to automatically, without user intervention, fix the image as another photograph or replacing the original photograph.

In example embodiments, responsive to a "good image" being returned at block 504, the imaging device may take no further action. Or, the imaging device may illuminate a lamp such as a green LED indicating the photograph is "good" or acceptable. In addition, or alternatively, the imaging device may actuate its speaker(s) to play one or more sounds, such as a pleasant chime, indicating that the photograph is "good" or acceptable.

On the other hand, responsive to the output of a "bad" or unacceptably fouled photograph signal at block 506, the imaging device may illuminate a lamp such as a red LED indicating the photograph is "no good". In addition, or alternatively, the imaging device may actuate its speaker(s) to play one or more sounds, such as an unpleasant buzz, indicating that the photograph is "no good". In lieu of or in addition to presenting an audible and/or visual alert at block 406, anther photograph is automatically taken without user intervention.

FIG. 6 illustrates an example screen shot of a user interface (Up 600 that can be presented on any of the displays herein, such as any of the displays of imaging devices shown in FIGS. 1-3. A prompt 602 may be presented indicating to the user that he can select responses to be executed if the photograph is determined to contain an artifact or anomaly in FIG. 4 or 5.

A first selector 604 may be selected to indicate that no action is to be taken at block 406 or block 506, i.e., that no alert is to be presented. A second selector 606 may be presented to generate only an alert at block 406 or block 506.

Selectors 608 and 610 may be presented appendant to the logic of FIG. 5 to indicate, respectively, that another photograph is to be taken at block 506 without alerting the user that the initial photograph is affected by a fouled lens and the photograph may need to be fixed at block 506 while also alerting the user that the initial photograph contains a dirt speck, smudge, or other artifact or anomaly. It is possible for the user to be graphically shown where the speck of dirt is located on the lens or the sensor.

If desired, a selector 612 may be selectable to indicate whether a "good photograph" alert is to be output as disclosed above at block 404 or 504 when the photograph is in focus.

Now referring to FIG. 7, a UI 700 may be presented that includes a prompt 702 for the user to take a photograph of a clean white sheet of paper. On a known white background, this can make the anomaly stand out. Alternatively, this photograph can be compared to subsequent photographs at blocks 400 or 500 to determine whether the same artifact or anomaly appears in both photographs, indicating a fouled lens.

While particular techniques are herein shown and described in detail, it is to be understood that the subject matter which is encompassed by the present application is limited only by the claims.

What is claimed is:

1. An assembly, comprising:
    a housing;
    at least one processor in the housing;
    at least one imager supported on the housing and configured to communicate with the processor;
    at least one computer storage in the housing and comprising instructions executable by the processor to:
    render a first photograph;
    determine whether the first photograph has an anomaly caused by debris on a lens or sensor;
    responsive to the first photograph comprising an anomaly caused by debris on a lens or sensor, generate a first signal to cause an alert to be presented on the assembly, or to eliminate the anomaly automatically without user intervention, or to cause an alert to be presented on the assembly and to eliminate the anomaly automatically without user intervention; and
    wherein the alert is a first alert and the instructions are executable to:
    responsive to the first photograph not comprising the anomaly, generate a second signal to cause a second alert to be presented on the assembly, the second alert being different from the first alert.

2. The assembly of claim 1, wherein the instructions are executable to:
    responsive to the first photograph comprising the anomaly, generate a first signal to cause an alert to be presented on the assembly.

3. The assembly of claim 1, wherein the instructions are executable to:
    responsive to the first photograph comprising the anomaly, generate a first signal to cause a second photograph to be rendered automatically without user intervention.

4. The assembly of claim 1, wherein the instructions are executable to:
    responsive to the first photograph comprising the anomaly, generate a first signal to cause an alert to be presented on the assembly and to cause a second photograph to be rendered automatically without user intervention.

5. The assembly of claim 1, wherein the first photograph is rendered responsive to actuation of a shutter associated with the imager.

6. The assembly of claim 1, wherein the alert comprises at least one of the following: an audible alert, a visible alert, an audible alert and a visible alert.

7. The assembly of claim 1, wherein the assembly also includes a display, and responsive to the first photograph comprising an anomaly, the user is shown in the user interface on display where the debris is located on the camera.

8. The assembly of claim 1, wherein the instructions are executable to:
    determine whether the first photograph comprises the anomaly using image recognition including comparing the first photograph to at least one image captured prior to generating the first photograph.

9. The assembly of claim 8, wherein determining whether the first photograph includes the anomaly is executed by a server receiving the first photograph.

10. The assembly of claim 8, wherein determining whether the first photograph includes the anomaly is executed by the processor of the assembly.

11. A method, comprising:
    receiving a first photograph from an imaging device imager;
    determining whether the first photograph is fouled at least in part by using image recognition including comparing the first photograph to at least one image captured prior to generating the first photograph;
    responsive to the first photograph being fouled, generating a first signal to cause an alert to be presented on the assembly, or causing a second photograph to be rendered automatically without user intervention, or causing an alert to be presented on the assembly and causing a second photograph to be rendered automatically without user intervention.

12. The method of claim 11, comprising:
responsive to the first photograph being fouled, generating a first signal to cause an alert to be presented on the assembly.

13. The method of claim 11, comprising: responsive to the first photograph being fouled, generating a first signal to cause a second photograph to be rendered automatically without user intervention.

14. The method of claim 11, comprising:
responsive to the first photograph being fouled, generating a first signal to cause an alert to be presented on the assembly and causing a second photograph to be rendered automatically without user intervention.

15. The method of claim 11, wherein the alert is a first alert and the method comprises:
responsive to the first photograph not being fouled, generate a second alert different from the first alert.

* * * * *